United States Patent [19]
Deerkoski et al.

[11] 3,965,475
[45] June 22, 1976

[54] SWITCHABLE BEAMWIDTH MONOPULSE METHOD AND SYSTEM

[75] Inventors: Leonard F. Deerkoski, Crofton; Richard F. Schmidt, Seabrook, both of Md.

[73] Assignee: The United States of America as represented by the United States Administrator of the National Aeronautics and Space Administration, Washington, D.C.

[22] Filed: May 30, 1975

[21] Appl. No.: 582,318

[52] U.S. Cl. .............................. 343/854; 343/779; 343/755
[51] Int. Cl.² ........................................ H01Q 3/26
[58] Field of Search .......... 343/854, 853, 852, 857, 343/858, 742, 743, 776, 777, 778, 779, 755, 16 M, 16 LS

[56] References Cited
UNITED STATES PATENTS

| | | | |
|---|---|---|---|
| 3,164,835 | 1/1965 | Alsberg | 343/779 |
| 3,307,189 | 2/1967 | Meade | 343/777 |
| 3,364,490 | 1/1968 | Hannan | 343/854 |

Primary Examiner—Archie R. Borchelt
Assistant Examiner—Tommy P. Chin
Attorney, Agent, or Firm—Ronald F. Sandler; Gary F. Grafel; John R. Manning

[57] ABSTRACT

In a switchable beamwidth monopulse method and system, an antenna comprising a curved reflector and a first set of monopulse feeds positioned in the effective region of the Airy disc of the antenna includes a second set of monopulse feeds. The second set of monopulse feeds is positioned outside the Airy disc in the region of first bright Airy ring. In narrow beamwidth monopulse operation, monopulse sum and difference channel patterns are obtained from the first set of feeds within the Airy disc. In wide beamwidth monopulse operation, the difference channel pattern is obtained from the second set of feeds in the Airy ring; the sum channel pattern is obtained by attenuation and phase shifting the sum channel signal obtained from the first set of feeds, and adding the resultant to the sum channel signal obtained from the second set of feeds. In a simplified form of the invention, the difference channel patterns for both narrow and wide beamwidth mode operation are obtained from the second set of feeds, while the sum channel patterns are obtained as described above.

9 Claims, 7 Drawing Figures

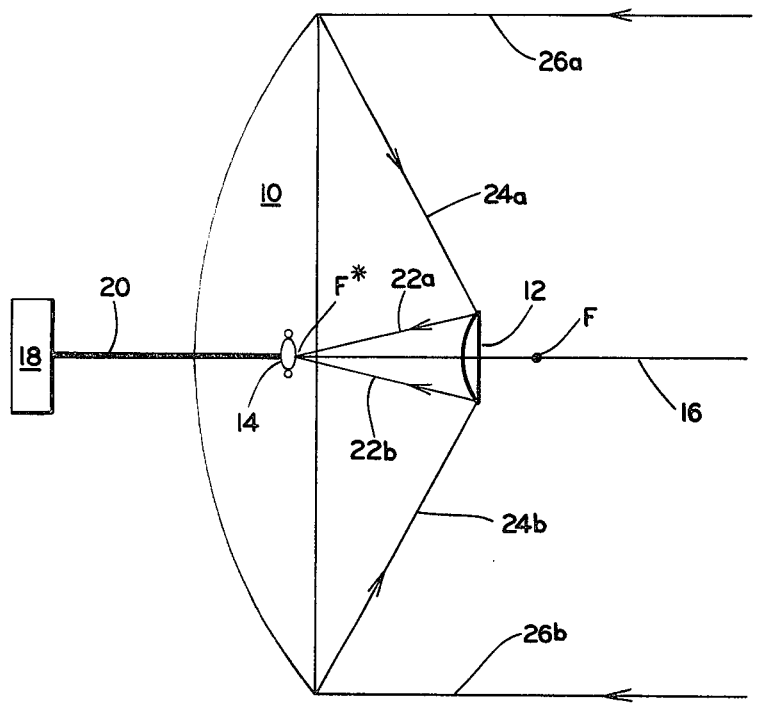
FIG.1
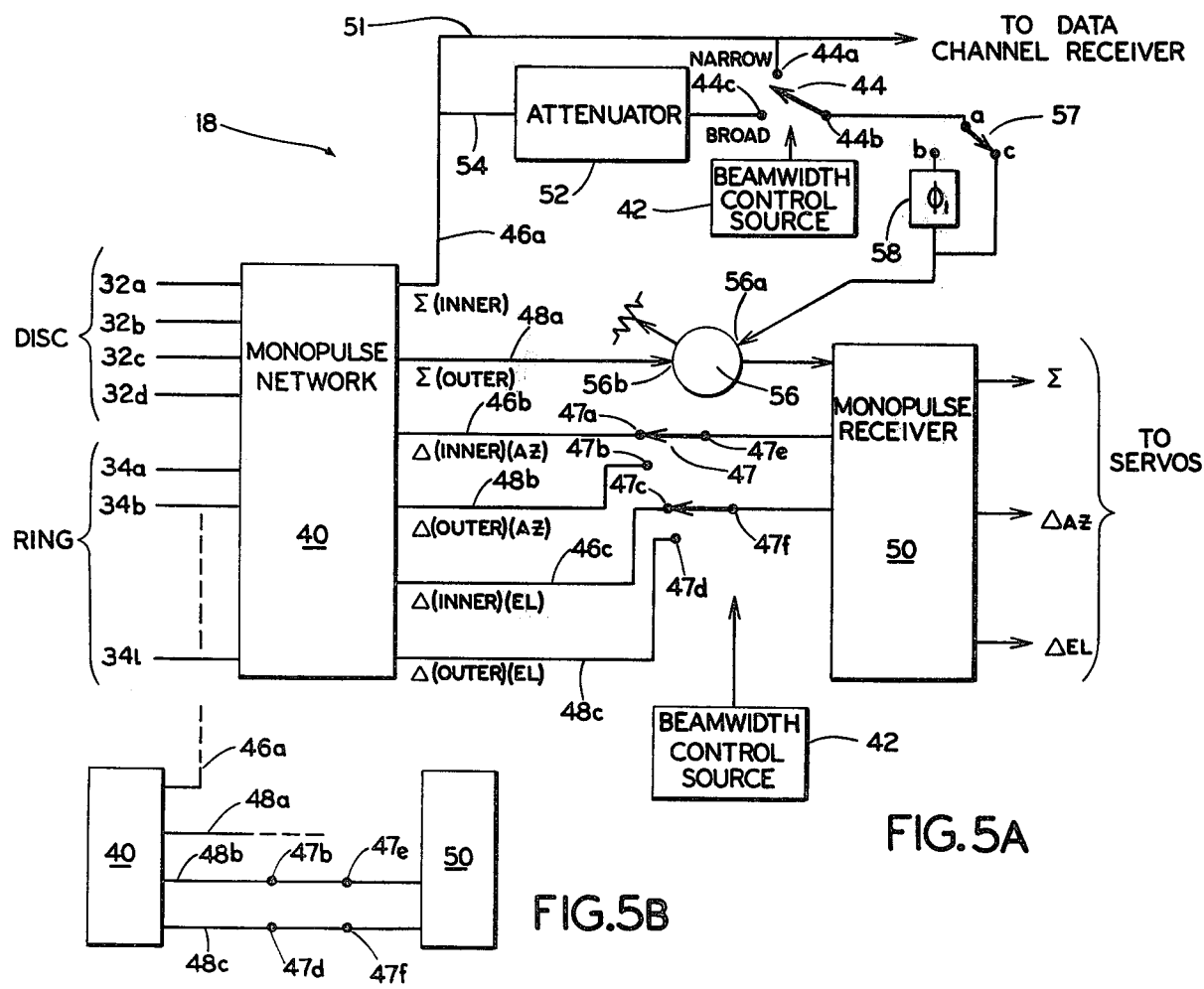
FIG.5A
FIG.5B

SWITCHABLE BEAMWIDTH MONOPULSE METHOD AND SYSTEM

ORIGIN OF THE INVENTION

The invention described herein was made by employees of the United States Government and may be manufactured and used by or for the Government for governmental purposes without the payment of any royalties thereon or therefore.

FIELD OF THE INVENTION

The present invention relates generally to switchable beamwidth antennas, and more particularly to a switchable beamwidth antenna employing sets of monopulse feeds in the first Airy bright ring, as well as in the Airy disc of the antenna.

BACKGROUND OF THE INVENTION

The conventional Cassegrain monopulse, or simultaneous lobing, antenna system comprises a main reflector, a sub-reflector and a set of monopulse feeds arranged in the conjugate focal region of the sub-reflector. The set of monopulse feeds typically comprises four feed elements offset a small distance from each other along the boresight axis. When the antenna operates in a receiving mode, the outputs of the individual feed elements are processed so as to provide sum and difference channel signals. The sum channel signal corresponds to a narrow beam of radiation lying along the boresight axis of the antenna. The difference channel signal for four feeds corresponds to a pair of V-shaped beams of radiation that are orthogonal to one another and have a lone null orthogonal to the boresight axis. In the receiving mode, R.F. energy reflected from or generated by a target is collected by the main reflector of the monopulse antenna, and detected by the monopulse feeds at the conjugate focal region of the sub-reflector. Using conventional hybrid junction means, signals from four feeds are added and subtracted to provide information on the angular deviation of the target from the boresight axis of the antenna. Range can also be obtained if desired.

The details of the conventional monopulse system are well known and will not be discussed in depth herein. A rigorous discussion of monopulse is found in Rhodes, D.R., "Introduction to Monopulse", McGraw-Hill Book Company, Inc., 1959. Also, for brevity, since it is well known that antennas are reciprocal (have the same characteristics for transmitting as for receiving), the discussion of the antenna is made with respect to a receiving antenna with the understanding that similar principles apply for a transmitting antenna.

The field of view, or beamwidth, of an antenna relates to the size of the region subtended by the main beam of the antenna radiating pattern. For example, in the case of a narrow beamwidth, high gain monopulse antenna, the antenna is capable of very accurately tracking a target within a narrow field of view. However, using a narrow beamwidth antenna, it is difficult to initially sight a small target in a large search area, in a mode termed "acquisition".

One approach for effecting acquisition is to cause the narrow beam to scan the search area using scanning patterns such as zig-zag or conical. Another approach is to provide means for switching or zooming the antenna between narrow beamwidth and wide beamwidth operation. The antenna is first operated in a wide beamwidth mode to view a relatively large search region for the target. Once the antenna is pointed so that the target would be in its narrow field of view, acquisition has occurred and the antenna is switched, or zoomed, to its narrow beamwidth mode to take advantage of greater gain or efficiency. The narrow beamwidth mode is then maintained, tracking the target by conventional simultaneous lobing techniques.

The acquisition problem is particularly acute for narrow beamwidth antennas having large main reflector dishes of the type considered by the National Aeronautics and Space Administration for Tracking and Data Relay Satellites (TDRS) to relay to earth data collected from orbiting earth observation satellites or spacecraft. These antennas, operating at 15 Gigahertz, would have a main dish diameter of approximately 12.5 feet (3.8 meters) with a consequent narrow half power beamwidth of approximately 0.4°. Initial pointing of the narrow beamwidth antenna of the data relay satellite toward an earth observation satellite or spacecraft would be difficult to achieve because of attitude instabilities of the data relay satellite and time variant radiation pattern offsets resulting from non-uniform solar heating of the antenna. Thus, a means for increasing the beamwidth of the antenna to effect acquisition is required.

Numerous techniques for switching or zooming the beamwidth of a monopulse antenna have been considered for TDRS. For example, in one prior technique, the antenna is defocused by axially shifting either a feed or a subreflector. This technique is undesirable for spaceborne equipment, such as TDRS, because moving parts are required. This increases the possibility of component failure, and increases the weight of the satellite by requiring additional fuel for its operation. Further, the antenna pattern amplitude and phase characteristics have a tendency to become distorted as the beamwidth is widened, and compensation apparatus substantially increases the complexity of the system. Also, the efficiency of the antenna, particularly in the wide beamwidth mode, is reduced.

In another prior technique, a polarization sensitive grating is placed in front of the main dish to serve as a smaller main dish for the wide beamwidth mode. This grating, although smaller than the dish, is sufficiently forward therefrom to intercept substantially all radiation emanating from a feed. The grating passes only one of vertically or horizontally polarized radiation toward the main dish and reflects the other. The radiation that is passed to the main dish provides a narrow beamwidth pattern; the radiation that is reflected from the grating provides a wide beamwidth pattern. Thus the antenna beamwidth is switchable by switching between vertical and horizontal feed polarization. However, the technique does not permit the use of circular polarization, which has both vertical and horizontal polarization components.

Another prior technique, for switching antenna beamwidth is disclosed in the patent to Schmidt U.S. Pat. No. 3,866,233, commonly assigned with the present invention, wherein a feed means selectively excites only the central region of a main dish reflector for wide beamwidth, or substantially the entire main dish reflector for narrow beamwidth. In one embodiment disclosed in that patent, a convex hyperbolic subreflector is provided with an outer annular region that is selectively translated along the main dish boresight axis to excite different areas of the main dish in response to excitation from a single feed located on the axis. In a second embodiment, an ellipsoidal subreflector is provided in view of the main dish reflector and has two foci on each of which is positioned a separate feed. One feed faces the main dish and excites its entire surface for narrow beamwidth operation; the other feed faces the subreflector and excites only a portion of the main dish reflector via the subreflector for wide beamwidth operation. While these switchable beamwidth antennas perform satisfactorily, they require movable parts or feed support structure redesign. These requirements are potentially impracticable in some spaceborne equipment. For many applications, there still exists a need for providing switchable beamwidth operation in a monopulse antenna that does not require any moving parts, complete redesign of the feed support structure, or substantially increased complexity.

OBJECTIVES OF THE INVENTION

It is an object of the present invention to provide a new and improved switchable beamwidth antenna.

It is a further object of the present invention to provide a new and improved switchable beamwidth antenna selectively operable in a narrow beamwidth track mode and a wide beamwidth acquisition mode, wherein relative movement of antenna elements is not required.

It is a further object of the present invention to provide a new and improved switchable beamwidth antenna usable with circularly polarized radiation.

It is a further object of the present invention to provide a switchable beamwidth antenna having a new and improved feed structure that is adapted to be used in a conventional monopulse antenna without substantial feed structure redesign.

It is a further object of the present invention to provide a new and improved switchable beamwidth antenna that does not incur substantially reduced R.F. efficiency in the wide beamwidth mode of operation.

SUMMARY OF THE INVENTION

A switchable beamwidth antenna comprises a large main reflecting concave parabolic dish, a smaller hyperboloidal dish, and two sets of monopulse feeds located effectively in a focal region on the boresight axis of the dish. The first (inner) set of monopulse feeds, preferably comprising four feed elements, is positioned within the effective region of the Airy disc at the conjugate focal plane of the subreflector antenna. This subsystem, along with the large dish reflector, provides narrow beamwidth monopulse sum and difference channel radiation patterns that are suitable for tracking mode operation. The provision of a set of monopulse feeds in the effective region of the Airy disc of a monopulse antenna is disclosed in application Ser. No. 500,979, filed Aug. 27, 1974, to R. F. Schmidt, assigned to the common assignee, and does not in itself constitute the present invention. However, in accordance with the present invention, a second (outer) set of monopulse feeds, located outside the Airy disc in the region of the first Airy ring, is provided to widen the beamwidth of the monopulse radiation pattern for acquisition mode operation. The phrase "widen the beamwidth" in this context is meant increase the beamwidth of the sum channel pattern, as well as the V-shaped orthogonal channel patterns.

The outer set of monopulse feeds preferably comprises at least four feed elements, but in any event a four-fold symmetry, corresponding to each of the feed elements in the inner set of feeds. Associated with the outer set of monopulse feeds, there are elevation and azimuth difference channel radiation patterns comprising two orthogonal V-shaped difference patterns, each pattern having at least 2½ times the beamwidth of the beams associated with the inner set of feeds in the Airy disc. However, due to the widely spaced geometry of the outer feed elements, the sum channel pattern is in interferometer radiation pattern with a main lobe sum beamwidth that is even narrower than that of the sum channel pattern associated with the inner set of feeds.

Accordingly, in one embodiment of the invention, for acquisition (wide beamwidth) mode operation, the difference channel pattern is supplied by the outer set of monopulse feeds; the sum channel pattern of the inner set of feeds in the region of Airy disc is attenuated and phase shifted, and then added to the interferometer sum channel pattern of the outer set of feeds in the region of the Airy ring. For track (narrow beamwidth) mode operation, the sum and difference channel patterns are supplied by the inner set of feeds.

In a simplified embodiment of the invention, in track mode operation, the narrow beamwidth sum channel pattern is supplied by the inner set of feeds, while the difference channel pattern is supplied by the outer set of feeds. In wide beamwidth mode operation, the difference channel pattern is supplied by the outer set of feeds while the sum channel pattern is provided by both the inner and outer sets of feeds as described supra. This embodiment is used in applications where wide angle squinted beams are suitable for both track and acquisition mode operation, and simplifies the mode switching hardware.

The outputs of the first and second sets of feed elements are supplied to a conventional monopulse network comprising a system of hybrid junctions. The monopulse network converts the feed element outputs into sum and difference channel signals associated with each of the feed sets.

Mechanical coaxial cable or diode switch means, controlled by a beamwidth control source located at a ground control station or spacecraft, is provided between the monopulse network and a monopulse receiver. The monopulse receiver converts the monopulse signals into D.C. signals for controlling a servo system directing the antenna. In wide beamwidth mode operation, the switch means (1) supplies the difference channel signal of the outer set of feeds to the receiver, and (2) supplies the sum channel signal of the inner set of feeds to an attenuator and phase shifter, supplies the output of the phase shifter, as well as the sum channel (interferometer) signal of the outer feeds to a hybrid junction for vector addition, and supplies the output of the hybrid junction to the receiver. In narrow beamwidth mode operation, the switch means (1) supplies the difference channel signal of the inner feeds to the receiver and (2) supplies the sum channel signal of the inner feeds, as well as the interferometer signal, to the hybrid junction. The attenuator and phase shifter are thus bypassed by the sum channel signal of the inner feeds, and the unattenuated sum channel signal effectively "swamps out" the interferometer signal supplied by the outer feeds. Alternatively, and having the same effect, the sum channel signal of the inner feeds may be supplied directly to the receiver at the cost of additional switching hardware.

In the simplified embodiment of the invention, the difference channel signal of the outer feeds is supplied to the receiver in both narrow and wide beamwidth mode operation.

We are aware of another monopulse antenna utilizing additional feed elements, disclosed in U.S. Pat. No. 3,308,468 to Hannan, for independent control of the sum and difference channel patterns. However, in that patent, certain of the feed elements are used for sum channel radiation, and certain others are used solely for difference channel radiation. There is no teaching of using inner and outer sets of feeds wherein the sets are selectively used independently or in combination for wide or narrow beamwidth mode operation.

The above and still further objects, features and advantages of the present invention will become apparent upon consideration of the following detailed description of several specific embodiments thereof, especially when taken in conjunction with the accompanying drawing.

BRIEF DESCRIPTION OF THE DRAWING

FIG. 1 is a schematic representation of an antenna system used in accordance with the present invention;

FIG. 5A is a block diagram of one embodiment of a system for implementing the invention; and FIG. 5B is a partial block diagram of a simplified form of the invention.

DETAILED DESCRIPTION OF THE DRAWING

Figure 2A:
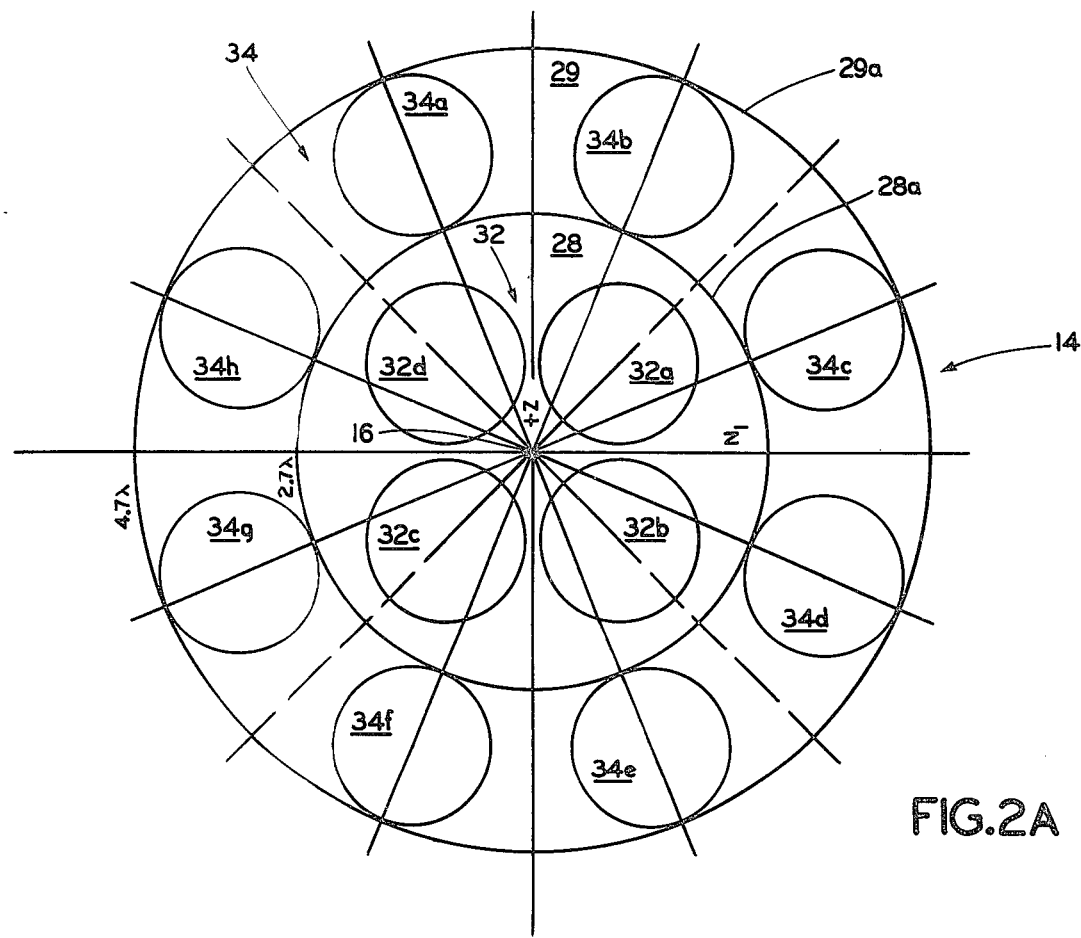
FIG. 2A is a boresight view of a portion of the main dish reflector showing the orientation of the first and second sets of monopulse feeds.

Referring to FIG. 1, there is illustrated a relatively large reflecting concave parabolic dish 10, a smaller convex hyperbolic subreflector 12, and a feed 14 in a Cassegrain configuration. The main dish 10, subreflector 12, and feed 14 are coaxial with antenna boresight axis 16, with subreflector 12 facing main dish 10 while feed 14 faces the subreflector. Incoming radiation (rays 26a and 26b) is collected by main dish reflector 10 and reflected toward subreflector 12 (rays 24a and 24b). The radiation is, in turn, reflected by subreflector 12 and converged on feed 14 (rays 22a and 22b). The radiation is then supplied to a monopulse processor 18 which converts the radiation to control signals for directing the antenna toward a target in its field of view.

It should be understood that antennas are reciprocal devices having the same beamwidth characteristics for reception and transmission. This description shall, for brevity, describe the antenna of the invention as a receiving device, but it is to be understood that the principles refer to either receiving or transmitting.

Still referring to FIG. 1, it is noted that rays 22a and 22b converge at a point in conjugate focal region F* (which is actually the focal region of subreflector 12). This is derived from conventional geometric optical principles. However, in reality, the phenomenon of diffraction causes rays 22a and 22b to approach focal region F* in an arc to thereby provide a focal disc rather than a focal point. This disc is known as the Airy disc, and it is surrounded by an infinite number of Airy diffraction rings. The radius $R_o$ of the effective region of the Airy disc for a single reflector, front feed system is defined as:

$$R_o = 1.22 \frac{F\lambda}{d} \tag{1}$$

where:
$F$ is the focal length of the reflector,
$\lambda$ is wavelength, and
$d$ is the diameter of the reflector.

For a multiple reflector system, the radius $R_M$ of the effective region of the Airy disc is:

$$R_M = MR_o \tag{2}$$

where:
$M$ is the magnification factor associated with the multiple reflector configuration, and $$M = \frac{\epsilon + 1}{\epsilon - 1} \tag{3}$$

where:
$\epsilon$ = eccentricity of the reflector.
For a hyperboloid:

$$\epsilon = [1 + (a/c)^2]^{1/2} \tag{4}$$

where:
$a$ and $c$ are the focus-to-center distance and semi-transverse axis, respectively.

Referring to FIG. 2A, viewing a portion of main dish reflector 10 along the boresight axis 16 thereof, the region of the Airy disc 28 is represented as being bounded by circle 28a, and the first bright Airy ring 29 is represented as existing between circle 28a and circle 29a. At 15 Gigahertz and with a main dish having a diameter of 12.5 feet, the distance between the boresight axis 16 and circle 28a, is 2.7$\lambda$, where $\lambda$ is wavelength, and the distance between circle 28a and the other periphery of the first Airy ring 29, represented by the circle 29a, is 4.7$\lambda$. These distances were verified using a computer simulation which accounted for the diffraction effects between the subreflector and the main dish and for the diffraction effects at the main dish.

Still referring to FIG. 2A, feed 14 disposed at the conjugate focal region F* of the antenna system comprises first (inner) and second (outer) sets of monopulse feeds generally designated respectively by numerals 32 and 34. The inner set of monopulse feeds 32 is oriented in the conjugate plane of the antenna system lying within effective region of the Airy disc 28. In the preferred embodiments, the inner set of feeds 32 comprises four feed elements 32a–32d offset from the axis 16 and from each other, and with a feed element positioned in each quadrant of Airy disc 28. Although four feed elements 32a–32d are shown in FIG. 2A, it is to be understood that other numbers of feed elements could be used. For example, each of the feed elements 32a–32d may include a plurality of individual feed elements, as known in the art.

The outer set of feeds 34 comprises at least four feed elements with the amount of energy captured from the region of the first Airy ring 29 being proportional to the number of feed elements. In FIG. 2A, by way of example, there is illustrated eight feed elements 34a–34h, located outside the Airy disc 28 in the region of the first bright Airy ring 29. The outer set of feeds 34, forming an important aspect of the invention, is described in detail infra, following a discussion of the radiation patterns associated with inner feeds 32.

Figure 2B:
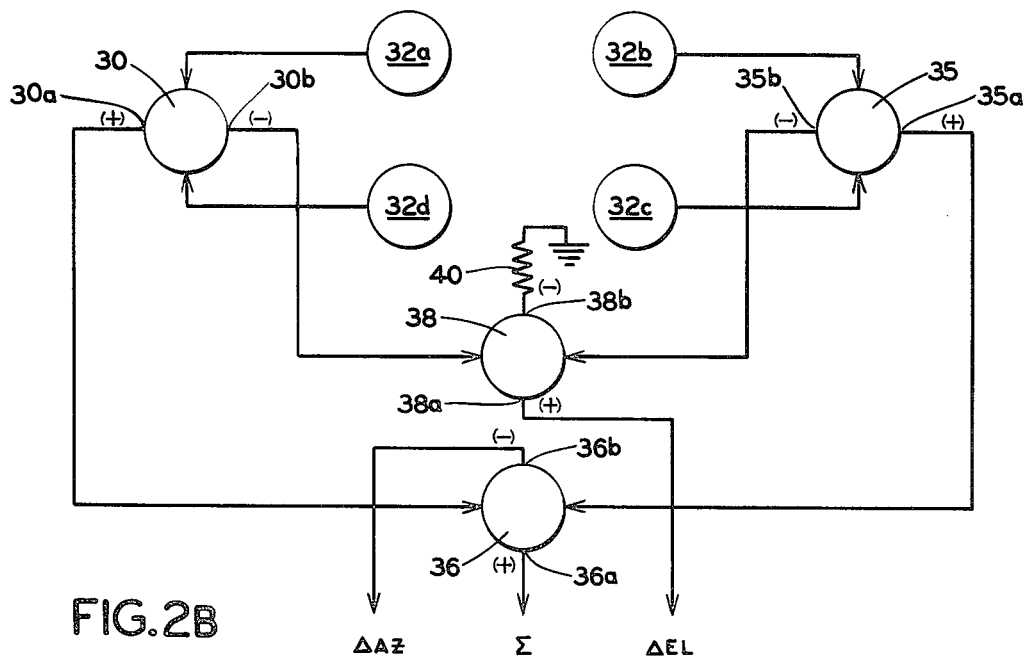
FIG. 2B is a schematic diagram of a monopulse network associated with the first set of monopulse feeds.

Although a basic understanding of monopulse techniques is assumed, the basic principles of monopulse radar with respect to feeds 32 will be briefly reviewed referring now to Figure 2B. In Figure 2B, feed elements 32a and 32d are summed in hybrid 30, and feed elements 32b and 32c are summed in hybrid 35. The two sums, outputted from the sum ports 30a and 35a of hybrids 30 and 35, are in turn, summed in hybrid 36 to produce a radiation pattern maximized in the boresight direction (sum channel radiation pattern). The difference port 36b of hybrid 36 provides the difference of the sum of feed elements 32a and 32d and feed elements 32b and 32c, and thus produces a radiation pattern which is minimum in the boresight direction with two maxima occurring on each side of the boresight in the azimuth plane (azimuth difference channel radiation pattern).

The two difference ports 30b and 35b of hybrids 30 and 35, when summed in hybrid 38, produce the difference of the sums of feed elements 32a and 32d, and feed elements 32b and 32c to produce a radiation pattern which is minimum in the boresight direction with two maxima occurring either side of boresight in the elevation plane (elevation difference channel radiation pattern). The difference port 38b of hybrid 38 produces the difference of the sums of the diagonal feed elements, which is redundant information and terminated in a load 40. Comparison of the resultant sum and difference patterns ($\Sigma$, $\Delta_{EL}$, $\Delta_{AZ}$) with reference data is applied to generate an error voltage which is used to keep the antenna pointed in the direction of the target. In a monopulse radar system, the sum channel radiation pattern, also known as the data beam, provides data indicative of the distance of a target from the antenna. At 15 Gigahertz, and with a main reflector dish 10 having a diameter of 12.5 feet, the half power beamwidth of the monopulse data beam is approximately 0.4°. The difference channel radiation pattern, also known as the V-shaped beams or acquisition beams, provides data indicative of the angular deviation of the target from the boresight axis of the antenna.

Figure 3:
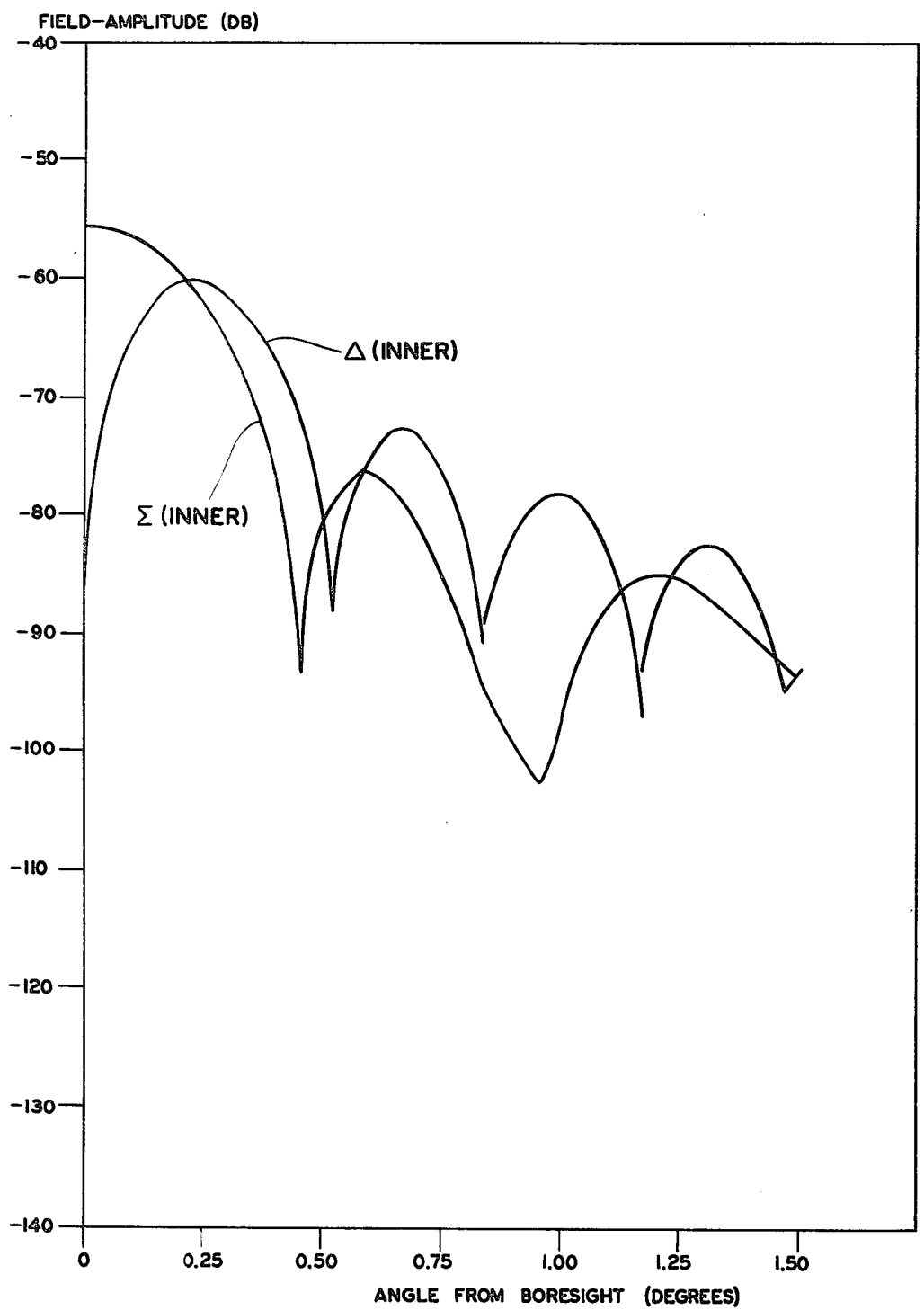
FIG. 3 is a graph illustrating the sum and difference channel radiation patterns associated with the first set of monopulse feeds for narrow beamwidth mode operation.

Examples of monopulse sum and difference channel radiation patterns associated with the inner set of monopulse feeds 32 in the antenna system of FIG. 1 are illustrated in FIG. 3, wherein radiation field intensity in decibels is plotted in rectangular coordinates as a function of angle from boresight. These patterns were derived by computer simulation, discussed supra. The sum channel radiation pattern $\Sigma$ (inner) has a half power beamwidth of approximately 0.4°. Although not shown in the graph, electrical phase associated with all of the patterns described herein, is approximately constant within each lobe with a step discontinuity in phase of $\pi$ radians between adjacent lobes of the patterns. The difference channel radiation pattern $\Delta$ (inner) has a null at the boresight axis and a maximum at approximately 0.25°.

In many monopulse systems, such as TDRS, a monopulse beamwidth of approximately 0.4° is suitable for tracking mode operation. However, for acquisition mode operation, an increased beamwidth of approximately 150 percent (BW = 2.5 BW) is desirable. there accordance with the present invention, the second set of monopulse feeds 34 (see FIG. 2A) is located in the region of the first bright Airy ring 29 bounded by circles 28a and 29a. In the preferred embodiment, eight monopulse feed elements 34a–34h are shown equispaced in the ring. However, it is understood that greater or fewer numbers of feed elements could be used providing four-fold symmetry is retained. For example, each of the feed elements 34a–34h may comprise several individual feed elements. As another variation, therec could be a larger number of feed elements distributed in the ring, for example, 16, 20, 24, ..., with a like number of feed elements 34 in the region of the Airy ring 29 corresponding to each inner feed element 32 in the region of the Airy disc 28. Also, the feed elements 34a–34h do not necessarily have to be equispaced, as shown in FIG. 2A by way of example. However, it should be understood that changes in the number of outer feed elements 34 and changes in the respective locations thereof, will to some extent affect the broad beam (acquisition) pattern associated with those feed elements.

Figure 4:
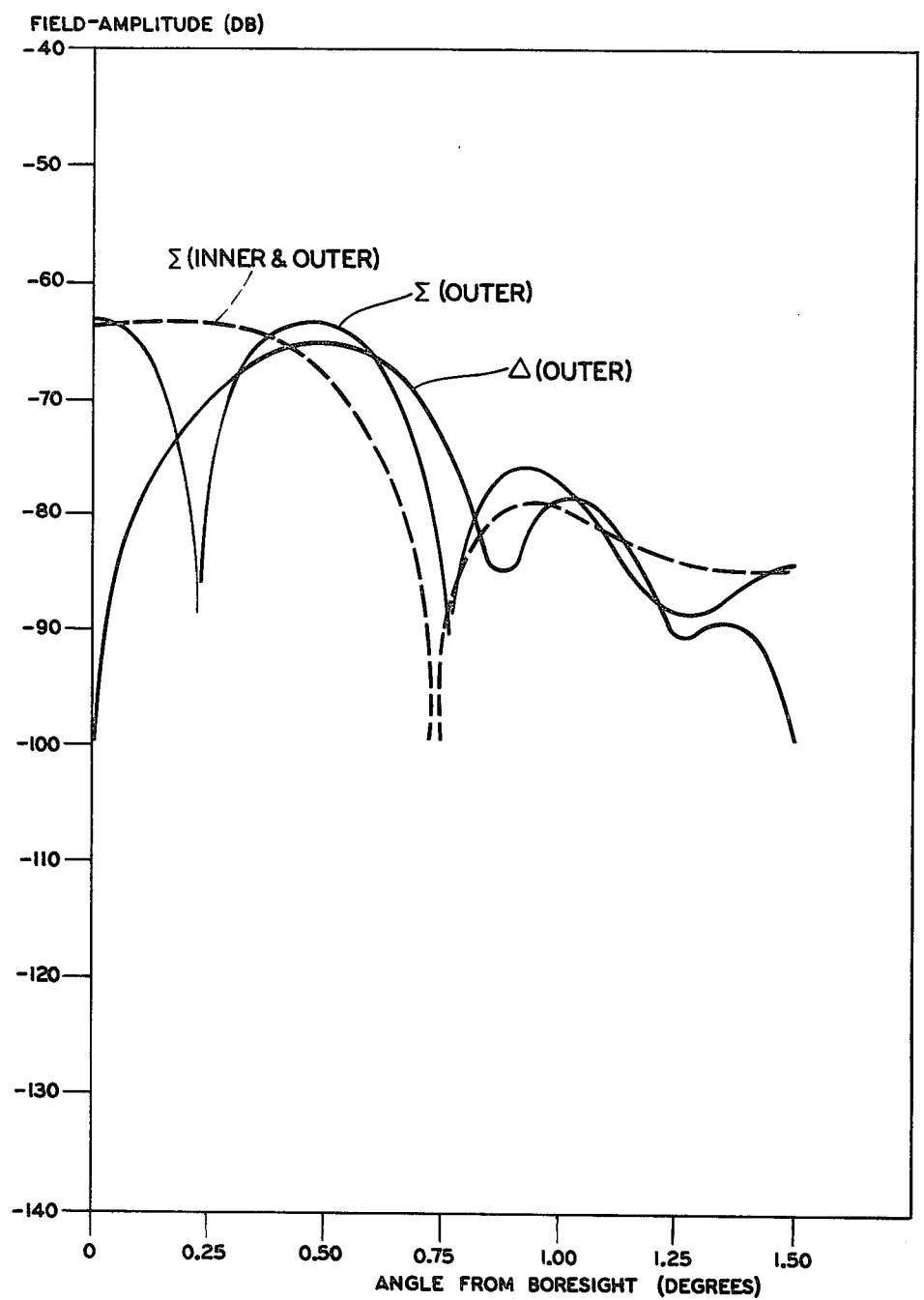
FIG. 4 is a graph illustrating the sum and difference channel radiation patterns associated with the second set of monopulse feeds, as well as the combined sum channel radiation pattern associated with the first and second sets of monopulse feeds for wide beamwidth mode operation.

Referring to FIG. 4, there are shown the relative magnitudes in decibels of sum channel and difference channel radiation patterns $\Sigma$ (outer), $\Delta$ (outer) as a function of angle from boresight, associated with the second set of feeds 34a–34h. Again, although not shown in the graph, electrical phase is approximately constant within each lobe shown. It is first noted that the difference channel radiation pattern $\Delta$ (outer) exhibited by outer feed elements 34a–34h exhibits satisfactory beamwidth increase characteristics with respect to amplitude. The difference channel radiation patern has a null on the boresight axis and a maximum at approximately 0.5° from the boresight axis. Accordingly, the difference channel radiation pattern $\Delta$ (outer) produced by outer feed elements 34a–34h, is widened compared to the difference channel radiation pattern provided by the first set 32 of monopulse feeds, and is thus supplied directly to processor unit 18 in FIG. 1. However, still referring to FIG. 4, the sum channel radiation pattern $\Sigma$ (outer) associated with the second set of feed elements 34a–34h in the Airy ring, is an interferometer pattern that has a main lobe half power beamwidth that is even narrower than that associated with the first set of feeds 32 in the effective region of the Airy disc 28. The interferometer pattern is due to the widely spaced geometry of the outer feed elements 34a –34h.

In accordance with the present invention, the beamwidth of the sum channel radiation pattern $\Sigma$ (inner) generated by the inner set 32 of monopulse feeds is "spoiled" or broadened by combining it with the interferometer pattern $\Sigma$ (outer) to provide a wide beamwidth for acquisition that is approximately 2.5 times as great as the narrow beamwidth utilized for tracking. The means by which the interferometer pattern $\Sigma$ (outer) produced by outer feed elements 34a–34h is used to broaden the beamwidth of the sum channel radiation pattern $\Sigma$ (inner) provided by the inner set of feed elements 32a–32d is discussed in detail with respect to FIG. 5A infra. However, it is recognized that the sum channel patterns associated with the inner and outer sets of monopulse feeds cannot be directly combined. This is because energy contained in the effective region of the Airy disc 28 has been found to be approximately thirteen decibels greater than the energy contained in the region of the first bright Airy ring 29. Also, there is a phase difference associated with radiation collected by the feed elements in the Airy ring 29 and disc 28 which must be considered in complex vector addition. Therefore, the sum channel pattern $\Sigma$ (inner) associated with the inner set of feeds 32 is attenuated (decoupled by 5.6db) and phase shifted, and then combined by complex vector addition with the sum channel radiation pattern $\Sigma$ (outer) associated with the outer set of feeds 34 in the Airy ring 29. Thus, according to one embodiment of the invention, in response to a ground or spacecraft beamwidth command signal, the monopulse antenna utilizes either (a) sum and difference channel radiation patterns from only the inner set of monopulse feeds 32 in the effective region of the Airy disc 28 for tracking mode operation, or (b) the difference channel radiation pattern of the outer set of monopulse feeds 34 in the region of the first bright Airy ring 29, and a combined sum channel radiation pattern for acquisition mode operation. The implementation of the present invention will now be described in more detail.

Referring to FIG. 5A, there is illustrated a block diagram of a system for implementing alternatively narrow beamwidth or wide beamwidth operation in the monopulse antenna of the present invention. The inner set of feed elements 32a–32d associated with the Airy disc 28 and the outer set of feed elements 34a–34h associated with the first Airy ring 29 are supplied to a conventional monopulse network 40. Monopulse network 40 comprises an array of hybrid junctions and microwave lines (not shown) for selectively adding and subtracting outputs of the individual feed elements to produce sum and difference channel R.F. signals associated with the data (sum channel) and azimuth and elevation error signals (difference channel) from each set of feed elements. The portion of monopulse network 40 for processing the outputs of inner feed elements 32a–32d is shown in FIG. 2B discussed supra. The portion for processing the outputs of feed elements 34a–34h is not shown but is understood to be similar to that shown in FIG. 2B.

The beamwidth control signal for switching the antenna between the narrow and wide beamwidth modes of operation is supplied from a beamwidth control source 42 located at a ground space station or spacecraft. The output of beamwidth control source 42 acts to control the position of switch means comprising switches 44, 47 and 57 between the narrow beamwidth and wide beamwidth mode positions.

The output of monopulse network 40 comprises inner feed lines 46a, 46b and 46c carrying R.F. energy associated respectively with sum channel, azimuth difference channel and elevation difference channel pattern data of the inner feeds 32, and outer feed lines 48a, 48b and 48c carrying R.F. energy associated respectively with sum channel, azimuth difference channel and elevation difference channel pattern data of outer feeds 34. The sum channel and difference channel data carried by lines 46a–46c and 48a–48c are processed in the system of FIG. 5A so as to selectively provide narrow beamwidth and wide beamwidth R.F. channel data to monopulse receiver 50. Receiver 50, which is conventional, multiplies the sum and difference channel signals in a phase-sensitive detector to obtain D.C. signals indicative of the range and angular deviation of the target from the boresight of the antenna. The D.C. signals outputted from receiver 50 are supplied to conventional servos for causing the antenna to track the target. In accordance with the invention, the D.C. signals outputted from receiver 50 alternatively are acquisition or tracking signals in accordance with the command signal originating at beamwidth control source 42.

As an overview of the system, the inner sum channel $\Sigma$ (inner) at line 46a is supplied to a data channel receiver (not shown) along line 51 and to an attenuator 52 along 54. The data channel receiver is located at a ground base station for a spacecraft, for example, and converts intelligence contained in the inner sum channel into a usable form, such as video or audial information. Attenuator 52 is a conventional coupler that couples energy between the input and output thereof with a predetermined loss ($5db$ in the present example).

A hybrid junction 56 has input ports 56a and 56b connected respectively to a phase shifter network 58, and to line 48a containing the outer sum channel $\Sigma$ (outer). A switch 44, such as a mechanical coaxial switch or diode switch, is connected selectively to monopulse network terminals 44a and 44c for respectively narrow beamwidth and wide beamwidth operation in accordance with beamwidth control source 42. The phase shifter 58 may be a conventional R.F. delay line (providing a constant phase shift of 37°, in the present example). It is to be understood that phase shifter 58 and the attenuator or decoupler 52 may have values other than those stated in the example. These values affect the beamwidth of the broad beamwidth radiation pattern and may be adjusted according to the particular requirements. The values stated were chosen in accordance with the particular requirements of TDRS, i.e., BW (acquisition $= 2.5$ BW (track).

Lines 46b and 46c, associated with the inner azimuth and elevation difference channels are supplied respectively to the inputs 47a and 47c of switch 47 (which is a diode or mechanical coaxial switch). Lines 48b and 48c associated with the outer azimuth and elevation difference channels are supplied to input terminals 47b and 47d of the switch 47. Outputs 47e and 47f carrying respectively narrow beamwidth or wide beamwidth azimuth and elevation difference channels are supplied to monopulse receiver 50.

As an overview of the operation of the embodiment of the system of FIG. 5A, in the narrow beamwidth mode, the unattenuated inner sum channel as well as the inner azimuth and elevation difference channels are supplied, through switches 44, 47 and 57, to monopulse receiver 50. The unattenuated inner feed sum channel is added to the interferometer pattern, but as will be explained in more detail, the amplitude of the interferometer pattern is insignificant compared to that of the unattenuated inner feed sum channel. In the wide beamwidth mode, the outer azimuth and elevation channels are supplied via switch 47 directly to receiver 50; the inner sum channel signal is attenuated (decoupled) and phase shifted, added to the outer sum channel interferometer pattern via switches 44 and 57, and the resultant is supplied to monopulse receiver 50.

Referring now to FIG. 5A in more detail, and considering first the narrow beamwidth mode of the antenna (in response to a narrow beamwidth request signal from source 42), switches 44, 47 and 57 are operated to cause contact bridges between switch terminals 44a and 44b, 57a and 57c, 47a and 47e, and 47c and 47f. The inner sum channel Σ (inner) at line 46a is supplied directly to one input port 56a of hybrid 56, bypassing phase shifter 58 through switch 57. Although the interferometer pattern of the outer feed sum channel Σ (outer) on line 48a is supplied to the other input port 56b of hybrid 56, the effect of the interferometer pattern is swamped out by the much larger magnitude of the unattenuated (fully coupled) inner feed sum pattern supplied to hybrid input port 56a. Accordingly, in effect, the inner feed sum channel Σ (inner) is supplied to monopulse receiver 50 substantially without any alteration by the much smaller interferometer pattern of the outer sum channel Σ (outer). Also, in the narrow beamwidth mode, the inner azimuth and elevation difference channels on lines 46b and 46c are supplied directly to monopulse receiver 50 via switch 47. Accordingly, monopulse receiver 50, responding to the narrow beamwidth sum and difference channel supplied by the inner feed elements 32a–32d, causes the antenna to operate in the narrow beamwidth, or track, mode.

In response to a wide beamwidth request signal from beamwidth control source 42, switches 44, 47 and 57 change state from those shown in FIG. 5A so that there are contact bridges formed between switch terminals 44b and 44c, 57a and 57b, 47b and 47e, and 47d and 47f. The inner feed sum channel is supplied to attenuator (decoupler) 52 along line 54, to phase shifter 58 through switches 44 and 57, and then to input port 56a of hybrid 56. The outer feed sum channel on line 48a is supplied directly to input port 56b of hybrid 56. Since the inner feed sum channel has been attenuated (by 5.6 decibels) in attenuator 52, and phase shifted (by 37°) in phase shifter 58, the sum channels associated with inner feed elements 32a–32d and outer feed elements 34a–34h, when added together in hybrid 56, provide the required wide beamwidth sum channel acquisition pattern. The wide beamwidth azimuth and elevation difference channel patterns are supplied directly to monopulse receiver 50 through switch 47.

In a simplified embodiment of the invention, referring to FIG. 5B, in some monopulse applications, it is not necessary to provide both wide and narrow beamwidth difference channel patterns; the wide beamwidth difference channel pattern suffices in both track and acquisition mode operation. Accordingly, in the simplified embodiment of the invention, switch 47 is omitted and the following terminals are hard-wired together: 47b and 47e, 47d and 47f. As a further simplification, line 46a may be connected directly to receiver 50 in the narrow beamwidth mode, rather than to input port 56a of hybrid 56. The remainder of the simplified embodiment of the invention is identical to the embodiment of FIG. 5A.

While there have been described and illustrated specific embodiments of the invention, it will be clear that variations in the details of the embodiments specifically illustrated and described may be made without departing from the true spirit and scope of the invention as defined in the appended claims. For example, although a Cassegrain antenna system has been described by way of example, it is understood that other configurations could be used. Also, it is to be understood that the location of the inner and outer set of monopulse feeds 32 and 34 are described as lying respectively in the effective regions of Airy disc and first Airy bright ring, it is to be understood that the outer set of feeds 34 may overlap somewhat into the effective region of the Airy disc or a higher order Airy ring without departing from the invention, or the inner set of feeds 32 may overlap somewhat into the region of the first Airy ring. In this regard, the phrase "located outside the Airy disc", defining a location of the second (outer) set of feeds, is not to be construed in the specification as limited to being wholly within the first bright Airy ring. For example, should the outer set of monopulse feeds 34 extend somewhat into the region second bright Airy ring, or overlap somewhat into the Airy disc, the values of attenuator 52 and phase shifter 58 would be modified so as to obtain the desired broad beam characteristic of the antenna, but the modification and position of the second set of feeds would not depart from the spirit of the invention.

What is claimed is:

1. A switchable beamwidth monopulse antenna having selectively a wide beamwidth mode and a narrow beamwidth mode responsive to a beamwidth selection command source, the antenna including a curved reflector having a boresight axis with a focal region of the reflector lying on said axis, there being associated with the antenna an Airy disc lying in the focal region, said Airy disc surrounded by an Airy ring, comprising:
   a first set of monopulse feeds located in an effective region of said Airy disc of said antenna;
   a second set of monopulse feeds located outside said Airy disc in the region of said Airy ring;
   first switching means for causing said antenna to operate in the narrow beamwidth mode including means connected to said first set of feeds for developing first sum and difference channel signals;
   second switching means for causing said antenna to operate in the wide beamwidth mode including means connected to said second set of feeds for developing second sum and difference channel signals, means for attenuating and phase shifting said first sum channel signal, and means for adding together said second sum channel signal and the output of said attenuating means;
   said first and second switching means controlled by said beamwidth selector command source.

2. The antenna of claim 1 wherein said second set of feeds is located within said Airy ring.

3. The antenna of claim 1 wherein said first set of feeds includes at least four feed elements, and said second set of feeds includes at least four feed elements.

4. The antenna of claim 3 wherein said feed elements of said second set are equispaced from each other in an annular region surrounding the periphery of said Airy disc.

5. The antenna of claim 4 wherein said second set of feed elements are located within said Airy ring.

6. The antenna of claim 1 wherein said signal adding means includes first means for adding together (a) said first and second sum channel signals in said narrow beamwidth mode, or (b) said second sum channel signal and the attenuated and phase shifted first sum channel signal in the wide beamwidth mode.

7. The antenna of claim 1 including means for outputting said difference signal associated with said first set of feeds in the narrow beamwidth mode, and said difference signal associated with said second set of feeds in the wide beamwidth mode.

8. The antenna of claim 1 including means for outputting said difference signal associated with said second set of feeds in both the wide and narrow beamwidth modes.

9. Method of operating a monopulse antenna selectively in wide beamwidth or narrow beamwidth modes, the antenna comprising a curved reflector having a boresight axis and a focal region lying on said axis, being associated with said antenna an Airy disc surrounded by at least one Airy ring in said focal region, comprising the steps of locating a first set of monopulse feeds within an effective region of said Airy disc, locating a second set of monopulse feeds outside said region of said Airy disc in the region of said Airy ring; deriving first sum and difference channel signals from said first set of feeds; deriving second sum and difference channel signals from said second set of feeds; and alternatively (a) supplying said first sum and difference channel signals to a monopulse receiver means for operation of the antenna in the narrow beamwidth mode; or (b) attenuating and phase shifting said first sum channel signal and then adding the resultant to said second sum channel signal, and supplying the result of the last named step, as well as said second difference channel signal to the monopulse receiver means for operation of the antenna in the wide beamwidth mode.

* * * * *